United States Patent [19]
König et al.

[11] Patent Number: 5,733,356
[45] Date of Patent: Mar. 31, 1998

[54] METHOD AND DEVICE FOR PROCESSING FREE-FLOWING MATERIALS

[75] Inventors: Heribert König, Duisburg; Gero Rath, Mülheim/Ruhr; Wolfgang Richter; Hermann Staubner, both of Duisburg, all of Germany

[73] Assignee: Mannesmann Aktiengesellschaft, Dusseldorf, Germany

[21] Appl. No.: 307,860

[22] PCT Filed: Jan. 6, 1993

[86] PCT No.: PCT/DE93/00011

§ 371 Date: Oct. 27, 1994

§ 102(e) Date: Oct. 27, 1994

[87] PCT Pub. No.: WO93/20252

PCT Pub. Date: Oct. 14, 1993

[30] Foreign Application Priority Data

Mar. 31, 1990 [DE] Germany ............... 42 11 164.1

[51] Int. Cl.$^6$ .................................... G22B 7/02
[52] U.S. Cl. ............... 75/10.29; 75/10.3; 75/10.31; 75/10.32; 75/961; 373/82
[58] Field of Search .............. 373/82; 75/10.29, 75/10.3, 10.31, 10.32, 961

[56] References Cited

U.S. PATENT DOCUMENTS

| | | | |
|---|---|---|---|
| 3,471,626 | 10/1969 | Weese et al. | 373/82 |
| 4,147,887 | 4/1979 | Yasukawa et al. | 373/82 |
| 4,410,996 | 10/1983 | Svensson | 373/82 |
| 4,940,486 | 7/1990 | Sommerville et al. | 75/10.19 |
| 5,566,200 | 10/1996 | Konig et al. | 373/82 |

FOREIGN PATENT DOCUMENTS 441052  8/1991  European Pat. Off. ......... 75/10.31

*Primary Examiner*—Melvyn Andrews
*Attorney, Agent, or Firm*—Cohen, Pontani, Lieberman, Pavane

[57] ABSTRACT

A method and apparatus for processing a contaminated free-flowing material and, in particular, filter dust from industrial metallurgical waste and domestic waste incineration plants are disclosed. In order to ensure that the end product of the plant can be reused or disposed of in an environmentally sound manner, the free-flowing material is mixed in the dry state with a reducing agent; the resulting mixture is inserted through the bore of a hollow electrode extending into a metallurgical vessel, so that the interior end of the electrode is immersed in the slag in the vessel, and the mixture is pneumatically injected through the electrode into the molten slag; heat is supplied to the mixture during the reaction between the mixture and the slag; evaporated components of the mixture are exhausted from the vessel; mixture components precipitated into the molten metal are tapped together with the molten metal; and the remaining components of the mixture which remain in the slag are discharged from the vessel together with the slag. The throughbore of the hollow electrode is connected to an arrangement for feeding and discharging gaseous media into the electrode. A power supply system includes components for maintaining a constant current and for regulating the electrical output thereof.

17 Claims, 1 Drawing Sheet

METHOD AND DEVICE FOR PROCESSING FREE-FLOWING MATERIALS

FIELD OF THE INVENTION

The present invention is directed to an apparatus and method for processing a contaminated free-flowing material and, in particular, for processing filter dust from steel production or garbage incineration plants.

BACKGROUND OF THE INVENTION

In a metal production or processing plant such, for example, as a steel plant, flue gas is typically guided through filters so as to minimize the amount of air pollutants being emitted into the environment. Dust particles in the flue gas may contain valuable alloying carriers (which quite often are toxic) as well as other environmentally hazardous or undesirable substances. Since the environmental laws and regulations have become increasingly stringent, the need is more urgent than before to recover valuable alloying carriers from the filter dust and to improve disposal characteristics of the toxic substances remaining therein.

By-products or end products from metal production occurring in the form of residues such, for example, as filter dust and sludge, have in the past typically been discarded in landfills. In so doing, two environmentally related parameters are not optimized. First, recoverable quantities of valuable alloying carriers and steel-improving components such, for example, as chromium, nickel, molybdenum and manganese are disposed of in a wasteful manner. Other recoverable materials so lost include lead and zinc. Second, residues containing toxic components must be disposed of in special disposal sites at great expense and at the risk of polluting the environment.

Solid residues resulting from garbage incineration include ashes, filter dust and various reaction by-products. In addition to the presence of heavy metal, these solid residues may also contain toxic organic compounds such, for example, as dioxin and furan. Furthermore, new and undesirable pollutants are generated by the incineration plains as the toxic materials contained in the garbage react and combine with other by-products, such as carbon monoxide and nitrogen oxides from a high-temperature combustion process. These new and undesirable pollutants, and oftentimes toxic substances, subsist in the incineration plant's residues including slag, filter ashes, flue gas and deposits.

There have heretofore been a number of proposals for the processing of such residues so as to resolve or minimize these problems. For example, German patent publication DE-OS 37 05 787 discloses heating of the waste dust in an oxidizing atmosphere to a temperature that is sufficient to support the formation of lead oxide vapors. The lead oxide vapors are then separated from the zinc oxide in the gas by solidifying the lead oxide, thereby recovering the lead oxide. This process, however, does not remove or recover numerous other toxic materials present in the waste dust.

German patent publication DE-OS 38 27 086 discloses a process for thermal decontamination of filter dusts and other residues and, particularly, residues from incineration plants, pyrolysis installations or varnish sludge processing plants. The process involves introducing the waste material into a crucible furnace to remove any dioxin and furan contained therein and subsequently melting the waste at temperatures of 1,400 to 1,600° C. The liquid phase of the waste material is extracted and quenched while the gas phase is treated in a dust extractor.

In all of these aforedescribed processes, only a portion of the toxic or valuable materials are eliminated or recovered.

Even as to those materials that are the intended subject(s) of the treatment, these toxic or valuable materials are not eliminated or recovered to a desirable or acceptable extent.

Therefore, it is an object of the present invention to provide a method and apparatus for treating contaminated free-flowing materials in which the resulting end product may be reused or disposed of in an environmentally sound manner.

SUMMARY OF INVENTION

The present invention makes use of a direct current (d.c.) or alternating current (a.c.) metallurgical vessel such, for example, as a smelting furnace or low-shaft furnace in which the free-flowing material to be treated is fed through the bore of a hollow electrode. The electrode is immersed in the slag which floats on top of a layer of melt or molten metal.

According to the invention, the free-flowing material and, in particular, filter dust from iron and steel plants, metallurgical plants and garbage incineration plants is processed in a metallurgical vessel. The filter dust is initially mixed in an appropriate ratio with a reducing agent such as coke slack and the optional addition of quartz and lime; the ratio may be readily determined by a person ordinarily skilled in the art. The quartz and lime exert an advantageous influence on the composition of the melt and on the sequence of the process in which the free-flowing material is mixed. Further advantageous effects may be achieved by mixing the free-flowing material with a carbon carrier having a particle size at least three-times greater than the particles of the free-flowing material.

The mixture of filter dust and reducing agent is inserted into the metallurgical vessel through the top of a hollow electrode and is then prematurely urged through and along the electrode to the surface of the slag which projects partially into the hollow electrode. When it comes into contact with the molten slag, the mixture absorbs heat from the slag and from the surrounding electrode. This contact also brings about a chemical reaction between the components of the mixture and the slag, which reaction generates a gas and causes foaming of the slag. The gas that is generated increases the pressure in the bore of the hollow electrode.

In accordance with to the invention, the gas pressure in the hollow electrode may be controlled or regulated. By decreasing the pressure, it is possible to control the extent to which the mixture is absorbed by the slag. By increasing the gas pressure, the mixture that has accumulated at the bottom of the hollow electrode can be forced into the melt at a predeterminately controlled rate. The pressure in the electrode may also be selectively varied by way of individual pressure shocks. The progressive increase in gas pressure and absorption of the mixture in the slag causes the slag to foam in a corresponding manner.

Foaming of the slag proximate the bottom of the electrode results in a noticeable increase in the electrical resistance of the slag. This effect is increased by the lowering of the temperature of the slag due to the introduction of the cooler mixture. In accordance with the invention, the electric power may be increased to a predetermined extent so that the supply of heat corresponds to the feed rate of the mixture. Furthermore, the individual temperatures of the molten metal, slag and gas may be controlled and regulated by adjusting the depth of the slag and/or the immersion depth of the electrode in the slag.

Depending upon the chemical composition and physical properties of the individual components contained in the mixture, these components may exit the metallurgical vessel in one of three ways. First, components which have a specific mass higher than that of the slag and which are allowed sufficient time to precipitate out of the slag will be absorbed by the melt and removed along with the melt from the metallurgical vessel. Second, those components which evaporate or which are so light that they become entrained by the gas are fed to a scrubber formed by a dust separator. If the mixture to be processed produces gases containing evaporated metals such as zinc and lead, these gases, insofar as they contain metals, are fed to a scrubber formed by a condenser in which the metals may be solidified and separated. If, on the other hand, the gases contain metals in the form of oxides, they can be discharged along with the dust and then reused. In order to eliminate pollutants that are resistant to high temperatures from the waste gas, charged gas can be supplied to an after-burning chamber. Finally, those components with a specific mass comparable to the slag will remain in the slag for removal from the metallurgical vessel together with the slag.

The mixture to be processed may advantageously be batch-fed to the top of the hollow electrode by a material feed system. The individual batches accumulating as plugs at the tip of the hollow electrode are forced into the slag by the pressure momentum of a transporting gas by a gas supply system located proximate the top of the electrode.

The dwell time of the mixture in the slag and, accordingly, the duration of the reaction between the individual particles of the free-flowing material and the slag, is influenced by the selection of the particular reducing agent and the size of the particles. So-called self-feeding pellets may be used in an advantageous embodiment.

The metallurgical vessel or smelting furnace is normally not tapped continuously, so that the slag can remain in the furnace vessel for a sufficient period of time; in this way, it is possible to exert further influence on the slag. The viscosity of the slag is a dominant factor in determining the intensity and duration of the reaction between the components of the mixture and the slag. In this regard, at least one additional electrode may be provided in the furnace to supply additional heat to the slag at a predetermined spacing from the hollow electrode so as to increase the viscosity of the slag.

The additional electrode is preferably also constructed as a hollow electrode, depending on the materials to be processed, so as to enable residual reactions of the slag by supplying such, for example, as carbon carriers through this additional electrode.

Combustible components in the flue gas (resulting from the reaction between the slag and the mixture) can be burned while they remain in the furnace chamber space. For this purpose, oxidizing fluids may be introduced into the furnace space for contact with the flue gas. In order to prevent the slag from being reoxidized by the oxidizing fluid, a layer of coke should be placed on the exposed surface of the slag.

A noteworthy advantage of the apparatus of the present invention is that the fine or dust-like charging materials are not exposed to the thermal lift of the hearth atmosphere when charged, thereby preventing an increase in dust particles in the waste gas.

As a result of the low specific mass of carbon carriers such as coke and coal, the charging components generally float on top of the slag bath. In prior art arrangements, this impairs and may even prevent that intimate contact between the melt and the reducing agent which is required for the metallurgical process, as for example metal recovery. The apparatus of the present invention overcomes this difficulty by injecting the reducing agent directly into the slag through the hollow electrode. The intended and necessary intimate contact is advantageously increased by turbulence in the slag caused by the direct feed of the free-flowing material through the hollow electrode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

Figure 1:
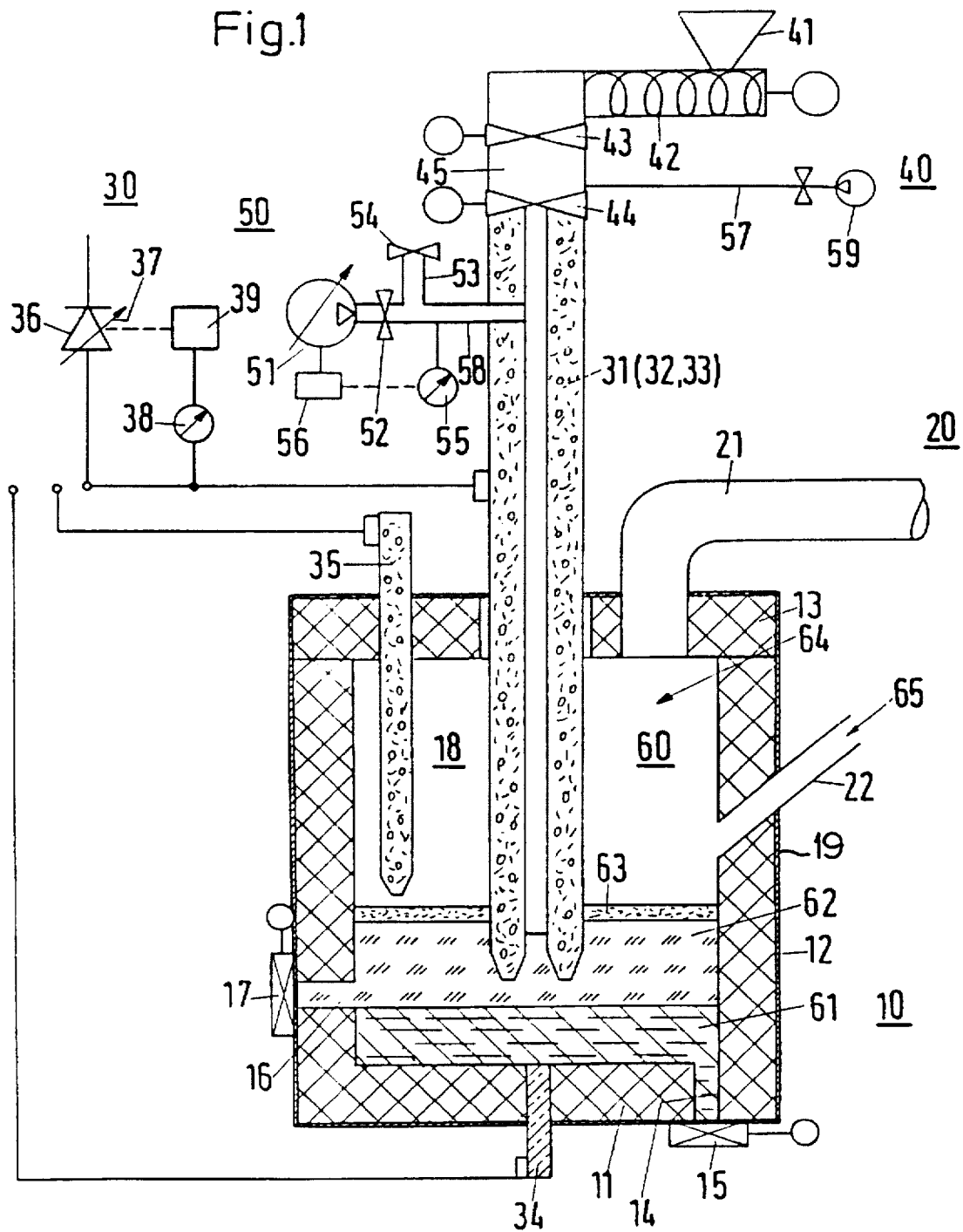

The FIGURE schematically depicts a metallurgical vessel constructed in accordance with the teachings of the present invention.

DETAILED DESCRIPTION OF THE PRESENTLY PREFERRED EMBODIMENTS

The FIGURE depicts a metallurgical vessel 10 implemented as a smelting furnace or a low-shaft furnace, constructed in accordance with the present invention and including a base 11, a wall 12 and a cover 13. As seen in the FIGURE, substantially all of the outer surface of the vessel 10 is provided with a refractory cladding 19. A tap opening 14 which can be closed by a locking device 15 is defined in or proximate the base 11. Further, a slag tap 16 which can be closed by a locking device 17 is provided in the wall 12. The cover 13 has a gas discharge outlet 21 in fluid communication with a gas cleaning arrangement 20, the details of which not shown in the FIGURE.

An elongated electrode 31 extends through the cover 13 such that the bottom of the electrode 31 projects into the metallurgical vessel 10 and, in operation, into the slag 62 contained in the vessel. Where the metallurgical vessel 10 operates on three-phase alternating current, additional electrodes 32 and 33 are likewise provided through the cover 13. Where the vessel 10 operates on direct current, on the other hand, a base electrode 34 is provided in the base 11.

In addition to the one or more electrodes 31 to 33, an optional solid or, as preferred, hollow electrode 35 may also extend through the cover 13 to advantageously provide additional heat to the slag 62.

A power supply system 30 includes a device 36 for generating a constant current and a component 37 for regulating power which are connected in turn to a regulating device 39. The regulating device 39 is connected to various measuring instruments such, for example, as a power measurement device 38. The power supply system 30 further includes a measuring and regulating component for regulating the feed and discharge of the gaseous media with respect to time, pressure and quantity. When the power supply system 30 operates with direct current, at least one thyristor is included. The thyristor is controllable and may include components or connections to a measuring and regulating device for varying the electrical output of the power supply system 30. In addition, measurement sensors for detecting electrical resistance of the molten slag may be connected to the measuring device 38 and regulating device 39.

At least the electrode 31 is preferably constructed as a hollow, tubular electrode having an axial bore extending therethrough. Depending on the needs of the plant operator, the additional electrodes 32, 33 and/or 35 may also be constructed as hollow tubular electrodes. The material feed system 40, which includes a container 41 for supplying the free-flowing materials to a volumetric conveyor 42, is arranged at the top of the one or more electrodes 31 to 33. As seen in the FIGURE, the conveyor 42 may be constructed as a screw or chain-type conveyor operable for transporting substantially precise proportions of the free-flowing materials to a lock 45 which is provided with shut-off devices 43 and 44 arranged at opposite ends of the lock. It is also contemplated that conveyor 42 be alternatively constructed as a cellular wheel, a device which is readily understood by persons ordinarily skilled in the pertinent arts.

The lock 45 (or a cell of the cellular wheel) is connected to a pressure line 57. The pressure line 57 permits the introduction of gaseous media into the lock 45 by means of a pump 59 and the control or regulation of the amount of the mixture and the rate for its transport into the vessel 10.

Downstream from the lock 45 is an arrangement for transporting the free-flowing material into and out of the one or more hollow electrodes 31 to 33. As illustrated in the FIGURE, that arrangement is implemented by a gas feed/ discharge system 50. At least the electrode 31 is connected to the gas feed/discharge system 50 which includes a shut-off device 52 and a pump 51 connected in-line to the bore of the hollow electrode 31 through a gas feed/discharge line 58. The gas feed/discharge line 58 also has an outlet opening 53 which may be opened by operation of a shut-off device 54. The pump 51 may be controlled by a pressure gauge 55 and a regulating device 56 connected to the gas feed line 58 in a suitable manner.

A gas feed 22 is defined in the wall 12 of the metallurgical vessel 10 so that an oxidizing agent 65 can be introduced into the furnace chamber space 18 through this gas feed 22.

During operation, the following media 60 are typically found in the metallurgical vessel 10: melt 61, slag 62, coke slack 63 and flue gas 64.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

We claim:

1. A method for processing, in a metallurgical vessel containing a layer of molten metal and a layer of slag disposed on the molten metal, a free-flowing material comprising a plurality of components for separating at least one of the components from the free flowing material for reuse or disposal, comprising the steps of:
   (a) forming a mixture by mixing the free-flowing material in a dry state with a reducing agent having a carbon carrier;
   (b) inserting the mixture into one end of a bore of a hollow electrode extending into the vessel, with another end of the bore being positioned at an interior of the vessel and immersed in the slag;
   (c) selectively adjusting a gas pressure in the electrode bore to advance the mixture, in batches, through the bore to contact and react with the slag;
   (d) supplying heat to the mixture batches in a controlled manner by applying electrical current to the electrode while the mixture reacts with the slag to cause cooling and foaming of the slag to thereby form a gas;
   (e) exhausting the gas from the vessel to a scrubber to remove from the vessel components of the mixture that become entrained in the gas;
   (f) tapping the molten metal to remove from the vessel components of the mixture having a greater specific mass than the slag which have melted and sunk into the molten metal; and
   (g) discharging components of the mixture other than said entrained components and said melted components and which remain in the slag by discharging from the vessel at least a portion of the slag containing the remaining components.

2. The method according to claim 1, wherein said step (a) further comprises mixing the free-flowing material with a reducing agent containing at least one of quartz and lime.

3. The method according to claim 1, wherein said step (a) further comprises mixing the free-flowing material with a carbon carrier having a particle size at least approximately three-times greater than a particle size of the free-flowing material.

4. The method according to claim 2, further comprising the step of forming the mixture as pellets for insertion into the electrode bore.

5. The method according to claim 1, further comprising the step of selectively adjusting the temperatures of the molten metal, slag and gas by varying at least one of a depth of the slag contained in the vessel and a depth of immersion of the electrode interior end in the slag.

6. The method according to claim 5, further comprising the step of increasing reaction activity of the components of the mixture remaining in the slag by increasing the temperature of the slag in the vessel.

7. The method according to claim 1, wherein said step (d) further comprises bringing the entrained components of the mixture into contact with oxidizing agents in the vessel prior to said exhausting to a scrubber.

8. The method according to claim 7, further comprising the step of subjecting the exhausted gas containing entrained components to after-burning to process components of the mixture that are toxic and resistant to high temperatures.

9. An apparatus for processing a contaminated free-flowing material, said apparatus comprising:
   a substantially closed metallurgical vessel for containing therein molten metal and molten slag;
   an electrode having an axial bore and projecting into the vessel for heating the molten metal and slag in response to an electrical current applied to said electrode;
   means for transporting the free-flowing material into the axial bore of said electrode through a first end of said electrode exterior of said vessel;
   a shut-off device connected to said first end of said electrode and operable for selectively opening and closing the bore at said electrode first end;
   means proximate said electrode first end and operable for feeding and discharging gaseous media to and from the bore of said electrode in a controllable amount and rate to selectively regulate pressure in said electrode bore and thereby selectively control movement of said free-flowing material along said electrode bore;
   power supply means for supplying a substantially constant electrical current to said electrode; and
   means for selectively regulating the substantially constant electrical current output to the electrode by said power supply means.

10. The apparatus according to claim 9, further comprising means for controlling the movement and rate of gaseous media fed to and discharged from the electrode bore by said transporting means.

11. The apparatus according to claim 9, wherein said power supply means includes at least one thyristor.

12. The apparatus according to claim 11, wherein said thyristor is controllable and is connected to a measuring and regulating device for varying, an electrical output of said power supply means.

13. The apparatus according to claim 9, wherein transporting means comprises a volumetric conveyor.

14. The apparatus according to claim 9, further comprising a lock disposed at least first end of the electrode and connected between said electrode and said transporting means for feeding the free-flowing material to said electrode in batches.

15. The apparatus according to claim 9, further comprising an additional electrode projecting into the vessel to a level spaced from the molten metal.

16. The apparatus according to claim 15, wherein said additional electrode has an axial bore therethrough.

17. The apparatus according to claim 9, wherein the vessel includes a side wall having an aperture through which an oxidizing agent is introducible into the vessel.

* * * * *